United States Patent Office 3,661,845
Patented May 9, 1972

3,661,845
FAST CURE ORGANOSILOXANE RESINS AND
METHOD FOR PREPARING SAME
Robert C. Antonen, Midland, Mich., assignor to Dow
Corning Corporation, Midland, Mich.
No Drawing. Filed July 9, 1970, Ser. No. 53,632
Int. Cl. C08f 11/04
U.S. Cl. 260—46.5 R  9 Claims

ABSTRACT OF THE DISCLOSURE

Mixing a random organosiloxane resin and an organo-acetoxysilane, such as methyltriacetoxysilane, in an organic solvent, allowing the mixture to react, adding the reaction product to water thus hydrolyzing the acetoxy groups, allowing an aqueous phase and an organic solvent product to form, separating same and thereafter azeotroping any residual water and by-products is a useful method for obtaining a fast cure organosiloxane resin which has a random organosiloxane resin base terminated by hydroxyl bearing organosiloxane units, such as monomethylsiloxane units. The fast cure organosiloxane resin is useful to provide faster curing resins for laminates, molding compounds and paints than conventional random organosiloxane resins.

---

This invention relates to an organosiloxane resin which is fast curing and a method for preparing same.

Organosiloxane resins are prepared by hydrolysis methods well known in the art. The hydrolysis methods usually are chlorosilanes which are hydrolyzed by water. There are a number of well-known methods such as adding the chlorosilanes to water, adding water to chlorosilanes, and using organic solvents with the chlorosilane hydrolysis such as toluene, xylene and alcohols, among others. Other silanes have also been used to provide organosiloxane resins, such as alkoxy and acetoxy silanes. The silanes hydrolyzed to provide the organosiloxane resins can be single silanes or mixtures of silanes from SiX$_4$, RSiX$_3$, R$_2$SiX$_2$ and R$_3$SiX where R is a monovalent organic radical bonded to the silicon atom through a silicon-carbon bond and X is a hydrolyzable group such as halogen, alkoxy and acetoxy. Organosiloxane resins are those materials with an R/Si ratio of less than 1.9.

In the preparation of organosiloxane resins, the hydrolysis of the silanes to silanols is followed in most cases by spontaneous condensation to siloxanes, particularly in the case of the chlorosilanes, since the hydrolysis of the chlorosilane produces hydrochloric acid which is a good condensation catalyst for the condensation of silanols to form siloxane linkages. In such hydrolysis, the most easily hydrolyzed groups are the first to hydrolyze and to form silanols and the least stable silanols are the first to condense to form siloxane linkages. In view of this, the resulting organosiloxane resins are left with those silicon-bonded hydroxyl radicals which are last formed during the hydrolysis and are the most stable toward condensation to form siloxane linkages. It is fortunate that this phenomenon exists, since it permits the formation of organosiloxane resins which are hydroxyl functional and which are organic solvent soluble so that they can be used as molding compositions, laminating resins, coatings, varnishes and the like. However, since the remaining silicon-bonded hydroxyl radicals on the organosiloxane resins are stable, the curing of such resins requires condensation catalyst and high temperatures to cause these last remaining stable silicon-bonded hydroxyl radicals to condense. The time for curing usually involves several hours for curing and even long post cures are sometimes necessary.

Organosiloxane resins which are composed of substantially all methylsiloxane units, particularly monomethylsiloxane units cure very rapidly and in fact are sometimes found to be too unstable to be useful as a soluble resin. Organosiloxane resins, on the other hand, which contain significant amounts of phenylsiloxane units are very stable and the curing process is usually slow.

It is known in the art that the rate of hydrolysis decreases with increasing number of organic radicals bonded to the silicon atom through silicon-carbon bonds, such as the chlorosilanes where SiCl$_4$ hydrolyzes very rapidly and the rate of hydrolysis can be summarized as follows:

$$SiCl_4 > RSiCl_3 \gg R_2SiCl_2 > R_3SiCl$$

This is shown in Eaborn, in "Organosilicon Compounds," Butterworths Scientific Publications, London, 1960, on page 179. This shows that the SiCl$_4$ forms silanols much more rapidly than RSiCl$_3$, for example. The stability of the silanols toward condensation falls steeply in the order.

$$R_3SiOH > R_2Si(OH)_2 > RSi(OH)_3 > Si(OH)_4$$

as shown by Eaborn on page 246. Eaborn also shows that the silicon-bonded hydroxyl radicals are more stable with increasing molecular weight of the organic groups attached to the silicon atom through a silicon-carbon bond. Thus, the art has shown that in the preparatoin of organosiloxane compounds, the remaining silicon-bonded hydroxyl radicals will be those which are the most difficult to form by means of hydrolysis and are the most stable toward condensation to form siloxane linkages. It is, therefore, an object of the present invention to provide a method for preparing organosiloxane resins which have easier to condense silicon-bonded hydroxyl radicals and to provide faster curing organosiloxane resins than the prior art organosiloxane resins.

The present invention relates to a method for preparing an organosiloxane resin comprising (A) mixing (1) a random organosiloxane resin having 0.1 to 10 inclusive weight percent silicon-bonded hydroxyl radicals, and having a ratio of organic radicals per silicon atom of 0.95 to 1.7 inclusive, said organic radicals being selected from the group consisting of monovalent hydrocarbon radicals and halogenated monovalent hydrocarbon radicals, at least 35 percent of the organic radicals being selected from the group consisting of aryl radicals and halogenated aryl radicals, said organosiloxane resin having siloxane units selected from the group consisting of monoorganosiloxane units, diorganosiloxane units and SiO$_2$ units, with (2) an organoacetoxysilane selected from the group consisting of methyltriacetoxysilane and a mixture of methyltriacetoxysilane and an organoacetoxysilane selected from the group consisting of phenyltriacetoxysilane, vinyltriacetoxysilane, ethyltriacetoxysilane, dimethyldiacetoxysilane and phenylmethyldiacetoxysilane wherein said mixture consists of at least 75 mol percent methyltriacetoxysilane, wherein the organoacetoxysilane (2) is present in an amount sufficient to provide from 1.0 to 1.1 inclusive molecules of organoacetoxysilane (2) per silicon-bonded hydroxyl radical of the random organosiloxane resin (1), in an organic solvent for the random organosiloxane resin in an amount sufficient to provide at least 20 weight percent organic solvent, (B) allowing the mixture obtained in (A) to react for at least 30 minutes at room temperature whereby an organosiloxane resin is obtained having organoacetoxysiloxane endblocking units, (C) adding the resulting product from (B) to water in an amount sufficient enough to provide at least a 10 mol percent excess of that amount sufficient to hydrolyze all the acetoxy groups, (D) agitating the mixture of (C) for at least 5 minutes at a temperature less than 100° C. thereafter, (E) allowing the mixture to form into an aqueous phase, and an organic solvent product phase, (F) separating the aqueous phase from the organic solvent product phase and thereafter, (G) azeotroping the organic solvent product phase whereby any remaining water and by-products are removed, whereby an organic solvent solution of an organosiloxane resin having silicon-bonded hydroxyl radicals which cures under a given set of curing conditions in a time shorter than the organosiloxane resin (1) is obtained.

The method of the present invention provides a means for preparing fast curing organosiloxane resins. A random organosiloxane resin such as is well known in the art and is readily available commercially, is the base material which is used in the present method. For the purposes of the present invention, a random organosiloxane resin is any well-known homopolymer or copolymer prepared by conventional prior art methods without regard to final organosiloxane structure, such as the hydrolysis of a mixture of chlorosilanes.

The random organosiloxane resins suitable for use in the present invention are those which have from 0.1 to 10 weight percent silicon-bonded hydroxyl radicals, preferably from 0.5 to 7 weight percent. The organic radicals bonded to the silicon atoms through silicon-carbon bonds of the random organosiloxane resin can be any monovalent hydrocarbon radical or any halogenated hydrocarbon radical, as long at at least 35 percent of the organic radicals are aryl radicals, halogenated aryl radicals or mixtures thereof. Preferably at least 45 percent of the organic radicals are aryl radicals, halogenated aryl radicals or mixtures thereof. The ratio of organic radicals per silicon atom is from 0.95 to 1.7 inclusive, preferably from 1 to 1.6 inclusive. The random organosiloxane resins, for the purpose of the present invention, are those having monoorganosiloxane units, diorganosiloxane units, $SiO_2$ units and mixtures thereof to provide the proper organic radical to silicon atom ratio.

The organic radicals can be any monovalent hydrocarbon radical such as alkyl radicals such as methyl, ethyl, propyl, isopropyl, butyl, pentyl, isopentyl, neopentyl, hexyl, octyl, dodecyl, octadecyl, 3-methylheptyl, 6-butyloctadecyl, tertiary butyl, myricyl and 2,2-diethylpentyl; alkenyl radicals such as, vinyl, allyl, hexenyl, butenyl, 3-octenyl, 4,9-octadecadienyl and 4-nonenyl; alkynyl radicals such as propynyl, heptynyl, butynyl, decynyl; alkenynyl radicals such as 1-penten-3-ynyl, 2-ethyl-1-buten-3-ynyl; cycloaliphatic radicals such as, cyclobutyl, cyclopentyl, cyclohexyl, cycloheptyl, propylcyclohexyl, 2,4-dimethylcyclopentyl, cyclohexenyl, bicyclo[3.1.0]hexyl, tricyclo[3.2.1.1$^{3,8}$] - 5 - nonenyl, spiro[4.5]decyl, dispiro[4.1.4.2]-1-tridecenyl, decahydronaphthyl, 2,3-dihydroindyl and 1,2,3,4-tetrahydronaphthyl; aryl radicals such as phenyl, tolyl, xylyl, 3-ethylphenyl, xenyl, naphthyl, anthracyl, pentacenyl, 3,4-methylethylphenyl, 9,9'-bifluoryl and 4-m-terphenyl; and aralkyl radicals such as 2-phenyl-octyl, 3 - methyl - 2 - (4-isopropylphenyl)heptyl, benzyl, 2 - ethyltolyl, 2-ethyl - p - cymyl, diphenylmethyl, 4,5-diphenylpentyl, 2-phenylethyl and 2-phenylpropyl.

The organic radicals can also be any monovalent halogenated hydrocarbon group such as aliphatic groups such as chloromethyl, 3-chloropropyl, 3,3,3-trichloropropyl, perfluorovinyl, chlorooctadecyl or radicals of the formula $R_fCH_2CH_2$— where $R_f$ can be any perfluoroalkyl group such as trifluoromethyl, perfluoroethyl, perfluoroisobutyl, perfluoroheptyl or perfluorooctadecyl; aromatic groups such as dichlorophenyl, tetrabromoxenyl, tetrachlorophenyl, alpha,alpha,alpha - trifluorotolyl or iodonaphthyl; cycloaliphatic groups such as chlorocyclohexyl, bromocyclopentyl or chlorocyclohexenyl and aralkyl groups such as chlorobenzyl, beta-(chlorophenyl) ethyl or beta-(iodophenyl)ethyl or beta-(bromophenyl) propyl.

The random organosiloxane resins can be composed of any combination of monoorganosiloxane units, diorganosiloxane units and $SiO_2$ units, as long as the ratio of organic radicals per silicon atom is within the defined limits.

When a random organosiloxane resin is a homopolymer, it must be composed of only monoorganosiloxane units wherein the organic radicals are either aryl radicals or halogenated aryl radicals. Copolymeric random organosiloxane resins can be composed of various combinations of the stated siloxane units.

The random organosiloxane resin is mixed with an organoacetoxysilane which is either methyltriacetoxysilane or a mixture of methyltriacetoxysilane and one or more of phenyltriacetoxysilane, dimethyldiacetoxysilane and phenylmethyldiacetoxysilane. When a mixture of methyltriacetoxysilane and one or more of the other acetoxysilanes is used, the mixture is at least 75 mol percent methyltriacetoxysilane. A mixture of acetoxysilanes is used when one desires to achieve some specific cure time which is slower than that obtainable with the methyltriacetoxysilane alone but faster than the cure of the starting organosiloxane resin.

The organoacetoxysilane is used in an amount sufficient to provide from 1.0 to 1.1 inclusive molecules of organoacetoxysilane per silicon-bonded hydroxyl radical of the random organosiloxane resin, preferably a one to one ratio is used.

The organoacetoxysilane is mixed with the random organosiloxane resin in an organic solvent for the random organosiloxane resin to provide at least 20 weight percent organic solvent, preferably at least 40 weight percent. The organic solvents for random organosiloxane resins are well known and include, for example, benzene, xylene, toluene, diethylether, chlorothene, cyclohexane, carbontetrachloride, chlorotoluene, acetone, cyclohexanone, methylethylketone, butyrone, methylisopropylketone, tetrahydrofuran and butylacetate.

The mixture of random organosiloxane resin and organoacetoxysilane is allowed to react for at least 30 minutes at room temperature. The length of time is not critical as long as at least 30 minutes are provided for the reaction. Additional time can be used and only economical considerations will dictate the maximum time used. The temperature need not be held at rom temperature but can be increased up to and including the boiling point of the system. Increasing the temperature will permit faster reaction and thus shorter times can be used, but at least 5 minutes reaction time should be allowed regardless of the temperature used. The reaction endblocks the hydroxylated random organosiloxane resin with organoacetoxysiloxane units. This reaction replaces all the difficult to condense hydroxy radicals with organoacetoxysiloxane uints.

The resulting product, a random organosiloxane resin endblocked with organoacetoxysiloxane units, is added to enough water to provide an amount of at least 10 mol percent excess of that amount necessary to hydrolyze all of the acetoxy groups. It is important that the resulting product is added to the water. Preferably an excess of 50 mol percent is used to provide greater amounts of silicon-bonded hydroxyl radicals remaining on the final product.

After the random organosiloxane resin endblocked with organoacetoxysiloxane units and water are mixed, the resulting mixture is agitated for at least 5 minutes at a temperature less than 100° C., preferably the temperature is room temperature. The mixture is allowed to hydrolyze for at least 5 minutes before the mixture is allowed to form into an aqueous phase and an organic solvent product phase. The maximum time the mixture is agitated can vary broadly, however, since the hydrolysis is rapid, periods of time in excess of 2 hours are usually not required. Preferably, the mixture is agitated for 10 minutes to one hour.

After the aqueous phase separates from the organic solvent product phase, the phases are separated, such as by decanting. The organic solvent product phase is then azeotroped to remove any residual water and by-products.

The aqueous phase comprises mainly water and by-produced acetic acid and the organic solvent product phase comprises mainly the organic solvent and the fast curing random organosiloxane resin containing silicon-bonded hydroxyl radicals, the product of the method.

Traces of water and acetic acid are removed from the product to increase the stability of the product during storage.

The product obtained from the above method is a fast curing organosiloxane resin which is also a part of the present invention.

The present invention also relates to an organosiloxane resin consisting essentially of a random organosiloxane resin base having a ratio of organic radicals per silicon atom of 0.95 to 1.7 inclusive, said organic radicals being selected from the group consisting of monovalent hydrocarbon radicals and halogenated monovalent hydrocarbon radicals, at least 35 percent of the organic radicals being selected from the group consisting of aryl radicals and halogenated aryl radicals and said random organosiloxane resin base having siloxane units selected from the group consisting of monoorganosiloxane units, diorganosiloxane units and $SiO_2$ units where said random organosiloxane resin base is terminated by silicon-bonded hydroxyl bearing organosiloxane units selected from the group consisting of monomethylsiloxane units and a mixture of monomethylsiloxane units and siloxane units selected from the group consisting of monophenylsiloxane units, monovinylsiloxane units, monoethylsiloxane units, dimethylsiloxane units and phenylmethylsiloxane units and said mixture being at least 75 mol percent monomethylsiloxane units, said hydroxyl bearing organosiloxane units being present in an amount of from 0.006 to 0.65 mol per 100 grams of said random organosiloxane resin base.

The organosiloxane resin which is fast curing consists essentially of a random organosiloxane resin as the base. This random organosiloxane resin base is described above. The random organosiloxane resin base is terminated by silicon-bonded hydroxyl radicals wherein the organosiloxane units bearing the silicon-bonded hydroxyl radicals are monomethylsiloxane units in an amount of at least 75 percent of such termination organosiloxane units and any other terminating organosiloxane units which bear silicon-bonded hydroxyl radicals are monophenylsiloxane units, dimethylsiloxane units and/or phenylmethylsiloxane units. Preferably, the hydroxyl bearing terminating organosiloxane units are all monomethylsiloxane units for the fastest curing random organosiloxane resins and the other terminating organosiloxane units are present when a somewhat slower cure is desired.

The amount of such hydroxyl bearing organosiloxane units is from 0.006 to 0.65 inclusive mol per 100 grams of the random organosiloxane resin base, preferably from 0.03 to 0.45 inclusive mol per 100 grams.

The fast cure organosiloxane resins of the present invention having a faster curing time than the starting random organosiloxane resin under any given set of curing conditions. For example, heating the fast cure organosiloxane of the present invention will cure in a shorter period of time than the random organosiloxane resin used in its preparation. Any of the conventional silanol condensation catalysts can be used in curing the fast cure organosiloxane resins, such as metal, salts, amine, and the like. However, the fast cure organosiloxane resins of the present invention will cure by heat alone. In certain applications where a slightly longer working time is required, the hydroxyl terminating organosiloxane units should include other than monomethylsiloxane units, monophenylsiloxane units, dimethylsiloxane units and/or phenylmethylsiloxane units.

The fast cure organosiloxane resins of the present invention are useful in most commercial applications where organosiloxane resins are used, such as in making laminates, as release coatings, as coil coatings, as molding compositions, in making paints and as electrical varnishes.

The following examples are presented for illustrative purposes only and should not be construed as limiting the present invention which is properly delineated in the claims.

EXAMPLE 1

A mixture of 445 g. of phenyltrichlorosilane, 238 g. of diphenyldichlorosilane and 670 g. of toluene was prepared and added to 2660 g. of water. The temperature increased to a maximum of 84° C. The reaction mixture was stirred for 20 minutes, thereafter an aqueous phase and an organic solvent product phase were allowed to form and the phases were then separated by decanting. The organic solvent product phase was azeotroped to remove the residual water. The product was a random phenylsiloxane resin having 6.0 weight percent silicon-bonded hydroxyl radicals. To this product, 350 g. of methyltriacetoxysilane was added and allowed to react for 30 minutes at room temperature. The resulting methylacetoxysiloxane endblocked organosiloxane resin was added to 2000 g. of water and agitated for 15 minutes. The mixture was then allowed to form into an aqueous phase and a toluene product phase. The phases were separated by decanting and the toluene product phase was azeotroped to remove the residual water and acetic acid. The product was a random phenylsiloxane resin composed of 70 mol percent monophenylsiloxane units and 30 mol percent diphenylsiloxane units and terminated by hydroxyl bearing monomethylsiloxane units.

A random phenylsiloxane resin (designated Resin 1) prior to reaction with the methyltriacetoxysilane was compared with the final random organosiloxane resin having terminal hydroxyl bearing monomethylsiloxane units (designated Resin 2).

| Resin | Weight loss after 3 hours at 250° C., (percent) | Gel time, minutes at 250° C. |
|---|---|---|
| 1 | 8.1 | 100 |
| 2 | 1.7 | 2.5 |

EXAMPLE 2

A random phenylsiloxane resin was prepared as described in Example 1, except the ingredients were 317 g. of phenyltrichlorosilane, 380 g. of diphenyldichlorosilane, 730 g. of toluene and 2460 g. of water. The resulting hydroxylated random phenylsiloxane resin was reacted with 345.2 g. of methyltriacetoxysilane, hydrolyzed and processed as described in Example 1, producing a random phenylsiloxane resin composed of 50 mol percent monophenylsiloxane units and 50 percent diphenylsiloxane units and terminated by hydroxyl bearing monomethylsiloxane units. The hydroxylated random phenylsiloxane resin had a gel time of greater than 100 minutes at 250° C. and random phenylsiloxane resin terminated by hydroxyl bearing monomethylsiloxane units had a gel time of 3 minutes at 250° C.

EXAMPLE 3

When a mixture of 100 g. of a hydroxylated random organosiloxane resin having 30 mol percent dimethylsiloxane units, 10 mol percent diphenylsiloxane units, 31 mol percent monomethylsiloxane units and 29 mol percent of monophenylsiloxane units and having 0.1 weight percent silicon-bonded hydroxyl radicals, 900 g. of xylene and a mixture of 0.99 g. of methyltriacetoxysilane and 0.42 g. of phenyltriacetoxysilane is allowed to react at room temperature for 2 hours, an organosiloxane resin is obtained which has methylacetoxysiloxane and phenylacetoxysiloxane endblocking. When this acetoxy organosiloxane resin is added to 100 g. of water, agitated for 5 minutes at room temperature, the aqueous phase is separated from the xylene product phase and the xylene product phase is azeotroped to remove residual water and acetic acid, an organosiloxane resin is obtained having silicon-bonded hydroxyl radicals on monomethylsiloxane units and monophenylsiloxane units where these units are present in an amount of 0.006 mol per 100 grams of the starting hydroxylated random organosiloxane resin.

EXAMPLE 4

When a mixture of 100 g. of a hydroxylated monophenylsiloxane resin having 10 weight percent silicon-bonded hydroxyl radicals, 25 g. of benzene, and 143.0 g. of methyltriacetoxysilane is allowed to react for 30 minutes at room temperature, a monophenylsiloxane resin is obtained which has methylacetoxysiloxane endblocking. When this acetoxy monophenylsiloxane resin is added to 26 g. of water, agitated for 20 minutes at 100° C., the aqueous phase is separated from the benzene product phase and the benzene product phase is azeotroped to remove residual water and acetic acid, an organosiloxane resin is obtained having silicon-bonded hydroxyl radicals on monomethylsiloxane units where these units are present in an amount of 0.65 mol per 100 grams of the starting hydroxylated monophenylsiloxane resin.

EXAMPLE 5

When a mixture of 100 g. of a hydroxylated random organosiloxane resin having 5 mol percent diphenylsiloxane units, 10 mol percent $SiO_2$ units, 40 mol percent monomethylsiloxane units and 45 mol percent monophenylsiloxane units and having 7 weight percent silicon-bonded hydroxyl radicals, 66.7 g. of a chlorothene and a mixture of 79.2 grams of methyltriacetoxysilane and 15.8 g. of dimethyldiacetoxysilane is allowed to react for 15 minutes at 60° C., an organosiloxane resin is obtained which has methylacetoxysiloxane and dimethylacetoxysilane endblocking. When this acetoxyorganosiloxane resin is added to 500 g. of water, agitated for one hour at room temperature, the aqueous phase is separated from the chlorothene product phase and the chlorothene product phase is azeotroped to remove residual water and acetic acid, an organosiloxane resin is obtained having silicon-bonded hydroxyl radicals on monomethylsiloxane units and dimethylsiloxane units where these units are present in an amount of 0.45 mol per 100 grams of the starting hydroxylated random organosiloxane resins.

EXAMPLE 6

When a mixture of 100 g. of a hydroxylated random organosiloxane resin having 20 mol percent methylvinylsiloxane units, 30 mol percent monoxenylsiloxane units, 30 mol percent diethylsiloxane units and 20 mol percent diphenylsiloxane and having 0.5 weight percent silicon-bonded hydroxyl radicals, 150 g. of toluene and a mixture of 6.54 grams of methyltriacetoxysilane and 0.78 g. of phenylmethyldiacetoxysilane is allowed to react one hour at room temperature, an organosiloxane resin is obtained which has methylacetoxysiloxane and phenylmethylacetoxysiloxane endblocking. When this acetoxy organosiloxane resin is added to 108 g. of water, agitated for 10 minutes at 80° C., the aqueous phase is separated from the toluene product phase and the toluene product phase is azeotroped to remove residual water and acetic acid, an organosiloxane resin is obtained having silicon-bonded hydroxyl radicals on monomethylsiloxane units and phenylmethylsiloxane units where these units are present in an amount of 0.03 mol per 100 grams of the starting hydroxylated random organosiloxane resin.

EXAMPLE 7

When a hydroxylated random organosiloxane resin having 40 mol percent phenylmethylsiloxane units, 20 mol percent diphenylsiloxane units, 20 mol percent monomethylsiloxane units and 20 mol percent monophenylsiloxane units and having 7 weight percent silicon-bonded hydroxyl radicals is substituted for the hydroxylated random organosiloxane resin of Example 5, an equivalent organosiloxane resin is obtained.

That which is claimed is:

1. A method for preparing an organosiloxane resin
   (A) mixing (1) a random organosiloxane resin having 0.1 to 10 inclusive weight percent silicon-bonded hydroxyl radicals, and having a ratio of organic radicals per silicon atom of 0.95 to 1.7 inclusive, said organic radicals being selected from the group consisting of monovalent hydrocarbon radicals and halogenated monovalent hydrocarbon radicals, at least 35 percent of the organic radicals being selected from the group consisting of aryl radicals and halogenated aryl radicals, said organosiloxane resin having siloxane units selected from the groups consisting of monoorganosiloxane units, diorganosiloxane units and $SiO_2$ units, with (2) an organoacetoxysilane selected from the group consisting of methyltriacetoxysilane and a mixture of methyltriacetoxysilane, and an organoacetoxysilane selected from the group consisting of phenyltriacetoxysilane, dimethyldiacetoxysilane, vinyltriacetoxysilane, ethyltriacetoxysilane and phenylmethyldiacetoxysilane wherein said mixture consists of at least 75 mol percent methyltriacetoxysilane, wherein the organoacetoxysilane (2) is present in an amount sufficient to provide from 1.0 to 1.1 inclusive molecules of organoacetoxysilane (2) per silicon-bonded hydroxyl radical of the random organosiloxane resin (1), in an organic solvent for the random organosiloxane resin in an amount sufficient to provide at least 20 weight percent organic solvent,
   (B) allowing the mixture obtained in (A) to react for at least 30 minutes at room temperature whereby an organosiloxane resin is obtained having organoacetoxysiloxane endblocking units,
   (C) adding the resulting product from (B) to water in an amount sufficient enough to provide at least a 10 mol percent excess of that amount sufficient to hydrolyze all the acetoxy groups,
   (D) agitating the mixture of (C) for at least 5 minutes at a temperature less than 100° C. thereafter,
   (E) allowing the mixture to form into an aqueous phase and an organic solvent product phase,
   (F) separating the aqueous phase from the organic solvent product phase and thereafter,
   (G) azeotroping the organic solvent product phase whereby any remaining water and by-products are removed, whereby an organic solvent solution of an organosiloxane resin having silicon-bonded hydroxyl radicals which cures under a given set of curing conditions in a time shorter than the organosiloxane resin (1) is obtained.

2. The method in accordance with claim 1 in which the organic solvent is separated from the organosiloxane resin product, whereby a solventless organosiloxane resin is obtained.

3. An organosiloxane resin consisting essentially of a random organosiloxane resin base having a ratio of organic radicals per silicon atom of 0.95 to 1.7 inclusive, said organic radicals being selected from the group consisting of monovalent hydrocarbon radicals and halogenated monovalent hydrocarbon radicals, at least 35 percent of the organic radicals being selected from the group consisting of aryl radicals and halogenated aryl radicals and said random organosiloxane resin base having siloxane units selected from the group consisting of monoorganosiloxane units, diorganosiloxane units and $SiO_2$ units where said random organosiloxane resin base is terminated by silicon-bonded hydroxyl bearing organosiloxane units selected from the group consisting of monomethylsiloxane units and a mixture of monomethylsiloxane units and siloxane units selected from the group consisting of monophenylsiloxane units, monovinylsiloxane units, monoethylsiloxane units, dimethylsiloxane units and phenylmethylsiloxane units and said mixture being at least 75 mol percent monomethylsiloxane units, said hydroxyl bearing organosiloxane units being present in an amount of from 0.006 to 0.65 mol per 100 grams of said random organosiloxane resin base.

4. The organosiloxane resin of claim 3 in which the ratio of organic radicals per silicon atom are from 1 to 1.6 inclusive and the terminating hydroxyl bearing organosiloxane units are monomethylsiloxane units.

5. The organosiloxane resin of claim 4 in which the amount of hydroxyl bearing organosiloxane units present are from 0.03 to 0.45 mol per 100 grams of said random organosiloxane resin base.

6. The organosiloxane resin of claim 4 in which the organic radicals are phenyl radicals.

7. The organosiloxane resin of claim 4 in which some of the organic radicals are phenyl radicals and any remaining organic radicals are methyl radicals.

8. The organosiloxane resin of claim 5 in which the organic radicals are phenyl radicals.

9. The organosiloxane resin of claim 5 in which some of the organic radicals are phenyl radicals and any remaining organic radicals are methyl radicals.

References Cited

UNITED STATES PATENTS

| | | | |
|---|---|---|---|
| 3,325,449 | 6/1967 | Ceyzeriat et al. | 260—46.5 |
| 3,435,001 | 3/1969 | Merrill | 260—46.5 |
| 3,489,782 | 1/1970 | Pruvost et al. | 260—448.2 |
| 3,274,288 | 9/1966 | Harris et al. | 260—825 |
| 3,135,713 | 6/1964 | Brewer et al. | 260—46.5 |
| 3,120,500 | 2/1964 | Huntington et al. | 260—46.5 |

DONALD E. CZAJA, Primary Examiner

M. I. MARQUIS, Assistant Examiner

U.S. Cl. X.R.

260—46.5 G